(12) United States Patent
Akiba

(10) Patent No.: US 12,241,520 B2
(45) Date of Patent: Mar. 4, 2025

(54) ROTARY DAMPER

(71) Applicant: TOK, Inc., Tokyo (JP)

(72) Inventor: Junichiro Akiba, Tokyo (JP)

(73) Assignee: TOK, INC., Tokyo (JP)

( * ) Notice: Subject to any disclaimer, the term of this patent is extended or adjusted under 35 U.S.C. 154(b) by 376 days.

(21) Appl. No.: 17/799,815

(22) PCT Filed: Feb. 17, 2020

(86) PCT No.: PCT/JP2020/006103
§ 371 (c)(1),
(2) Date: Aug. 15, 2022

(87) PCT Pub. No.: WO2021/166043
PCT Pub. Date: Aug. 26, 2021

(65) Prior Publication Data
US 2023/0080244 A1 Mar. 16, 2023

(51) Int. Cl.
*F16F 9/12* (2006.01)
(52) U.S. Cl.
CPC ............ *F16F 9/12* (2013.01); *F16F 2222/12* (2013.01); *F16F 2232/02* (2013.01); *F16F 2236/106* (2013.01)
(58) Field of Classification Search
CPC .......... F16F 9/12; F16F 9/145; F16F 2222/12; F16F 2232/02; F16F 2236/106
(Continued)

(56) References Cited

U.S. PATENT DOCUMENTS

| 3,747,915 A | 7/1973 | Hall |
| 4,527,675 A * | 7/1985 | Omata ..................... F16F 9/12 |
| | | 188/290 |

(Continued)

FOREIGN PATENT DOCUMENTS

| JP | 544760 A | 2/1993 |
| JP | 10299809 A | 11/1998 |

(Continued)

OTHER PUBLICATIONS

International Search Report with English Translation issued in corresponding International Application No. PCT/JP2020/006103 date of mailing Mar. 31, 2020 (7 pages).

(Continued)

*Primary Examiner* — Thomas W Irvin
(74) *Attorney, Agent, or Firm* — FLYNN THIEL, P.C.

(57) ABSTRACT

A rotary damper that does not cause a problem that a rotational resistance fluctuates during a rotation of a rotor is provided. On a bottom surface of a housing, a plurality of walls are erected concentrically centered on a bearing portion. Notches are formed in the walls at point-symmetrical peripheral positions centered on the bearing portion, and each notch is distributed and arranged at peripheral positions that evenly divide a circumference centered on the bearing portion between the adjacent walls. On a side surface of a rotor, a plurality of walls are erected concentrically centered on a center pin at a pitch deviated from a standing pitch of the walls of the housing by a half pitch. Notches are formed in the walls at point-symmetrical peripheral positions centered on the center pin, and each notch is distributed and arranged at peripheral positions that evenly divide a circumference.

5 Claims, 10 Drawing Sheets

(58) Field of Classification Search
USPC .......................................................... 188/290
See application file for complete search history.

(56) References Cited

U.S. PATENT DOCUMENTS

| | | | | | |
|---|---|---|---|---|---|
| 4,614,004 | A | * | 9/1986 | Oshida | ...................... E05F 3/14 |
| | | | | | 188/290 |
| 5,301,775 | A | * | 4/1994 | Nedbal | ...................... F16F 9/12 |
| | | | | | 188/290 |
| 5,718,309 | A | * | 2/1998 | Kariya | ...................... F16F 9/12 |
| | | | | | 188/290 |
| 5,944,152 | A | * | 8/1999 | Lindsay | .................. F16F 9/532 |
| | | | | | 188/293 |
| 7,059,454 | B2 | * | 6/2006 | Muller | ...................... F16F 9/12 |
| | | | | | 188/82.1 |
| 7,938,238 | B2 | | 5/2011 | Koizumi et al. | |
| 10,267,375 | B2 | * | 4/2019 | Muranaka | .................. F16F 9/12 |
| 11,415,194 | B2 | * | 8/2022 | Muranaka | ............ F16F 15/161 |
| 11,988,263 | B2 | * | 5/2024 | Hosoya | ...................... F16F 9/12 |
| 2004/0045398 | A1 | * | 3/2004 | Hayashi | .................... B60R 7/06 |
| | | | | | 74/573.1 |
| 2005/0115784 | A1 | * | 6/2005 | Muller | ...................... F16F 9/12 |
| | | | | | 188/82.1 |
| 2017/0261059 | A1 | * | 9/2017 | Muranaka | ................. F16F 9/12 |
| 2017/0343073 | A1 | * | 11/2017 | Muranaka | ............. F16F 9/3207 |

FOREIGN PATENT DOCUMENTS

| | | |
|---|---|---|
| JP | 2000220682 A | 8/2000 |
| JP | 3084137 U | 3/2002 |
| JP | 2005114154 A | 4/2005 |
| JP | 2006250191 A | 9/2006 |
| JP | 200764329 A | 3/2007 |
| JP | 2011231868 A | 11/2011 |

OTHER PUBLICATIONS

Written Opinion of International Searching Authority issued in corresponding International Application No. PCT/JP2020/006103 dated Mar. 31, 2020 (5 pages).

* cited by examiner

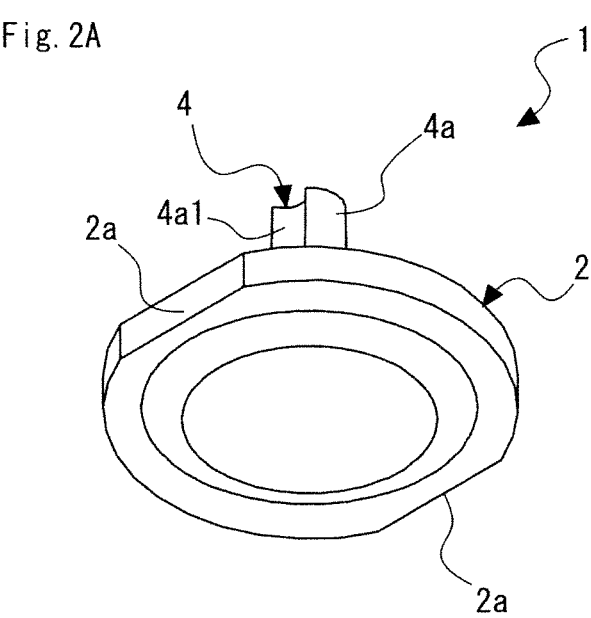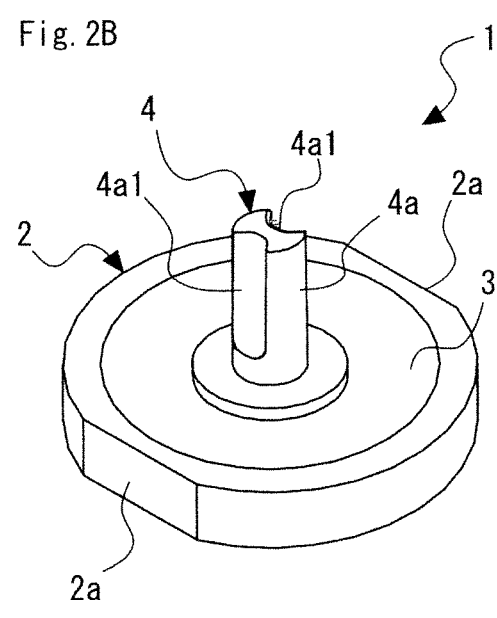

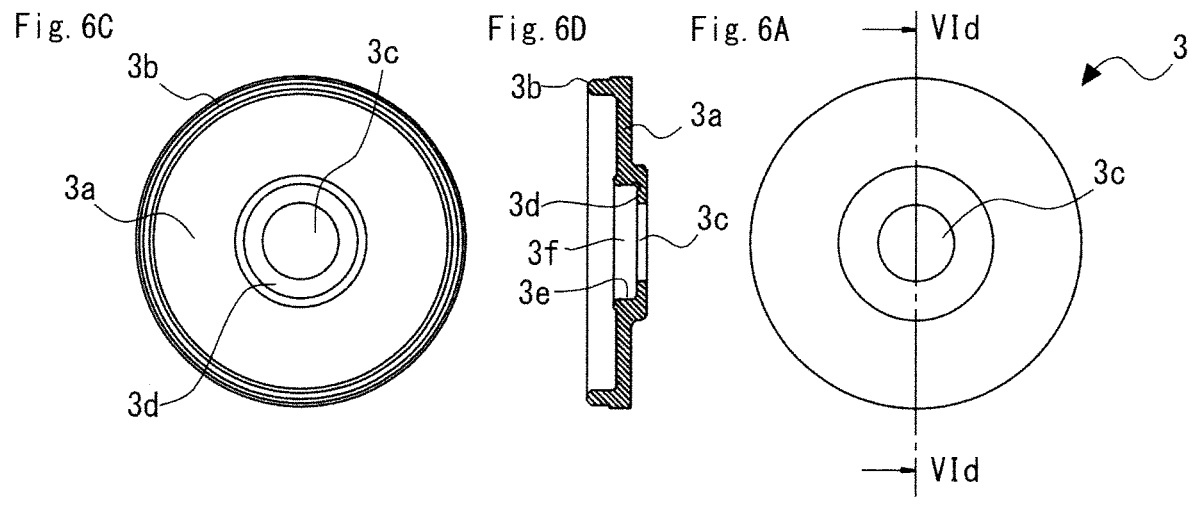
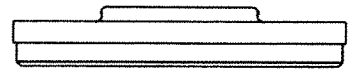
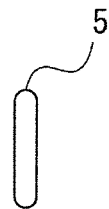
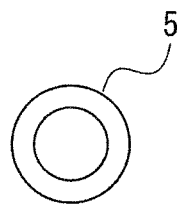

100
ROTARY DAMPER

TECHNICAL FIELD

The present invention relates to a rotary damper that imparts resistance to rotation of a rotor by a torque generated by a viscous fluid in a housing.

BACKGROUND ART

In the related art, as a rotary damper of this kind, for example, there is a rotary damper disclosed in PTL 1.

The rotary damper includes a case, silicone oil contained in the case, a rotor, and a cap that closes an opening of the case. The rotor is configured by providing a resistance portion that moves in the silicone oil on a shaft portion that partially protrudes from the case to the outside. The case is provided with a shaft support portion that supports the shaft portion of the rotor at a center of a bottom surface of a circular bottom portion, and a circumferential groove is provided as an air movement passage on a concentric circle centered on a center of the shaft support portion. Further, in the resistance portion of the rotor, a plurality of arc-shaped through holes are provided as air retention portions on a concentric circle centered on the center of the shaft portion, and concave grooves connecting the arc-shaped through holes are provided on front and back of the resistance portion as air movement passages on the concentric circle of the arc-shaped through hole.

When the rotor rotates, negative pressure parts are generated in downstream parts of the concave grooves, and thus, airs mixed in the case during assembly follow these negative pressure parts and move from one arc-shaped through hole to the other arc-shaped through hole. In this case, the airs pass through the circumferential groove and the concave grooves and move in a state of being hardly compressed. Therefore, in this rotary damper of the related art, even when the rotor rotates, generation of abnormal noise due to the airs mixed in the case is prevented.

CITATION LIST

Patent Literature

[PTL 1] JP-A-2005-114154

SUMMARY OF INVENTION

Technical Problem

However, in the rotary damper of the related art disclosed in PTL 1, the generation of abnormal noise due to the airs mixed in the case is prevented, but there is a problem that a rotational resistance fluctuated during the rotation of the rotor due to the influence of the airs staying inside the rotary damper.

Solution to Problem

The present invention has been made to solve such a problem,
according to the present invention, there is provided a rotary damper including: a housing of which an inside is filled with a viscous fluid; a cap which closes an opening of the housing; and a rotor which exposes a shaft to an outside from the cap and is accommodated in the housing and rotatably supported with respect to the housing, in which the rotary damper imparts a resistance to rotation of the rotor by a torque generated by a shear resistance of the viscous fluid, the housing includes a bearing portion which is formed at a center of a bottom surface facing a side surface of the rotor and rotatably supports a shaft center of the shaft, a plurality of walls which are erected concentrically centered on the bearing portion, include notches which are formed at point-symmetrical peripheral positions centered on the bearing portion and distributed and arranged at peripheral positions evenly dividing circumferences centered on the bearing portion between adjacent walls, and have a height forming a predetermined gap with the side surface of the rotor, a peripheral wall which is formed around an outermost wall of the plurality of walls and has a height abutting on a side surface of the cap, and a fitting portion which is formed around the peripheral wall and fitted to the cap, the rotor includes a supported portion which is formed at a center of the side surface facing the bottom surface of the housing and rotatably supported by the bearing portion, a plurality of walls which are erected concentrically centered on the supported portion at a pitch deviated from a standing pitch of the walls of the housing by a half pitch, includes notches formed in walls surrounded by an outermost wall at point-symmetrical peripheral positions centered on the supported portion and distributed and arranged at peripheral positions evenly dividing circumferences centered on the supported portion between adjacent walls, and have a height forming a predetermined gap with the bottom surface of the housing, a peripheral wall which is erected around the outermost wall of the plurality of walls and has a height forming a predetermined gap with the bottom surface of the housing, and a plurality of discharge holes which are formed at equal intervals with equal arc lengths in a circumferential direction centered on the supported portion and open the side surface of the rotor on an inner peripheral side of the peripheral wall, and the cap has a lid portion which covers a side surface of the rotor opposite to the side surface on which the plurality of walls are formed, and a peripheral edge portion which is formed around the lid portion and is fitted to the fitting portion of the housing.

According to this configuration, when the supported portion of the rotor is supported by the bearing portion of the housing and the rotor is accommodated in the housing, the rotor is accommodated in the housing so that the notches formed in the walls of the housing and the notches formed in the walls of the rotor are arranged at point-symmetrical peripheral positions centered on the bearing portion of the housing. Therefore, the notches are evenly distributed and arranged in the circumferential direction centered on the bearing portion of the housing, and a flow path of the viscous fluid extending radially while bending centered on the bearing portion of the housing is formed.

Accordingly, when assembling the rotary damper, after injecting a certain amount of viscous fluid into the bearing portion of the housing, in a case where a relative position between the housing and the rotor is set to the above-mentioned position and the rotor is accommodated in the housing, the viscous fluid travels along the flow path of the viscous fluid that extends radially while bending centered on the bearing portion of the housing, and the viscous fluid is evenly distributed and moves quickly toward the outer periphery of the housing while being promoted by the weight of the rotor together with airs mixed in the viscous fluid and becoming bubbles. When the viscous fluid reaches the plurality of discharge holes formed on the inner peripheral side of the peripheral wall of the rotor, the airs contained in the viscous fluid moved as described above toward the outer periphery of the housing are extruded by the viscous fluid from the plurality of discharge holes that open the side surface of the rotor and is discharged to the outside from between the bottom surface of the housing and the side surface of the rotor. In this case, since the notch is not formed in the outermost wall of the rotor, a momentum of the viscous fluid toward the outer periphery of the housing is suppressed by the outermost wall, and the viscous fluid is prevented from overflowing to the fitting portion of the housing.

Therefore, the cap is put on the opposite side surface of the rotor in this state, the peripheral edge portion of the cap is fitted to the fitting portion of the housing, and thus, it is possible to obtain the rotary damper in which airs do not stay inside the housing. Therefore, it is possible to provide the rotary damper that does not cause a problem that the rotational resistance fluctuates during the rotation of the rotor.

Moreover, in the present invention, in the housing, a pair of the notches is formed at peripheral positions of each wall facing 180° centered on the bearing portion, the notches formed in an innermost wall and a wall erected second outside the innermost wall are located on a straight line, and the notches formed in a wall erected first outside the innermost wall and the outermost wall erected third outside the innermost wall are located on a straight line orthogonal to the straight line passing through the notches formed in the innermost wall, and in the rotor, a pair of the notches is formed at peripheral positions of an innermost wall facing 180° centered on the supported portion, the notches formed in a wall erected first outside the innermost wall are located at four locations on two straight lines each inclined by 45° to a straight line passing through the notches of the innermost wall, the notches formed in a wall erected second outside the innermost wall are located at four locations on two straight lines of the straight line passing through the notches of the innermost wall and a straight line orthogonal to the straight line, and the outermost wall is erected third outside the innermost wall.

According to this configuration, when the supported portion of the rotor is supported by the bearing portion of the housing and the rotor is accommodated in the housing, the rotor is accommodated in the housing so that the straight line passing through each notch formed in the innermost wall of the housing at the peripheral position facing 180° and the straight line passing through each notch formed in the innermost wall of the rotor at the peripheral position facing 180° are orthogonal to each other. Therefore, the notches formed in each wall of the housing and the notches formed in each wall of the rotor are arranged at point-symmetrical peripheral positions centered on the bearing portion of the housing. Accordingly, the notches are evenly distributed and arranged in the circumferential direction centered on the bearing portion of the housing, and a flow path of the viscous fluid extending radially while bending centered on the bearing portion of the housing is formed.

Further, in the present invention, one wall of the plurality of walls formed in the housing is higher than the other walls, or one wall of the plurality of walls formed in the rotor is higher than the other walls.

According to this configuration, a size of a predetermined gap formed between tips of the plurality of walls formed in the housing and the side surface of the rotor, and a size of a predetermined gap formed between tips of the plurality of walls formed in the rotor and the bottom surface of the housing are increased by a degree that one wall of the plurality of walls formed in the housing is higher than the other walls, or a degree that one wall of the plurality of walls formed in the rotor is higher than the other walls. Therefore, in this case, a ratio of fluctuation in the size of each predetermined gap caused by variation in dimensions of parts to the size of each predetermined gap becomes small. Therefore, even when the size of each predetermined gap described above varies, it is possible to suppress fluctuations in the rotational resistance of the rotor due to the variation.

Further, in the present invention, a radial direction of each of the plurality of discharge holes is formed between an outer diameter of one inner wall of an outermost periphery and an inner diameter of the peripheral wall which are formed in the rotor, and the outermost wall formed in the rotor located at a center of a radial width of each discharge hole.

According to this configuration, the airs contained in the viscous fluid that has reached one inner wall of the outermost periphery formed in the rotor via the above-mentioned flow path of the viscous fluid are quickly discharged from each discharge hole, and the airs contained in the viscous fluid that get over of the outermost wall not having the notch formed in the rotor are also quickly discharged from each discharge hole. Therefore, the airs contained in the viscous fluid are efficiently discharged from each discharge hole.

Further, in the present invention, the rotor has the peripheral wall formed in a polygonal shape.

According to this configuration, a radial gap between the peripheral wall of the rotor and the outermost wall of the housing is formed large at a corner portion of the peripheral wall having a polygonal shape. Therefore, even when this gap is small at the side portion of the peripheral wall having a polygonal shape, the viscous fluid that reaches this gap smoothly flows from the gap large formed in the corner portion of the peripheral wall to the small gap formed in the side portion of the peripheral wall, and quickly fills the entire gap. Therefore, the airs contained in the viscous fluid that reaches the gap are quickly discharged to the outside from the discharge hole via the gap. Further, by adjusting the size of the entire gap, the magnitude of the rotational resistance given to the rotation of the rotor can be finely adjusted.

Further, in the present invention, in the opening of the housing, an abutment location between an outer periphery of the peripheral edge portion of the cap and the fitting portion of the housing is welded and sealed.

According to this configuration, a welded location between the housing and the cap is set to a location where the viscous fluid filling the inside of the housing does not reach. Therefore, it is possible to prevent the viscous fluid from reaching the welded location between the housing and the cap and making it impossible to weld the housing and the cap. Therefore, the housing and the cap are surely welded at the abutment location between the outer periphery of the peripheral edge portion of the cap and the fitting portion of the housing, and thus, the opening of the housing is surely closed and sealed by the cap.

Advantageous Effects of Invention

According to the present invention, it is possible to provide a rotary damper that does not cause a problem that the rotational resistance fluctuates during the rotation of the rotor.

BRIEF DESCRIPTION OF DRAWINGS

FIG. 2A is an external perspective view of the rotary damper according to one embodiment as viewed from a bottom surface side, and FIG. 2B is an external perspective view of the rotary damper thereof as viewed from a top surface side.

FIG. 6A is a plan view of a cap constituting the rotary damper according to one embodiment, FIG. 6B is a front view thereof, FIG. 6C is a bottom view thereof, and FIG. 6D is a cross-sectional view thereof taken along line VId-VId in FIG. 6A.

FIG. 7A is a plan view of a seal member constituting the rotary damper according to one embodiment, and FIG. 7B is a side view thereof.

DESCRIPTION OF EMBODIMENTS

Figure 1A:
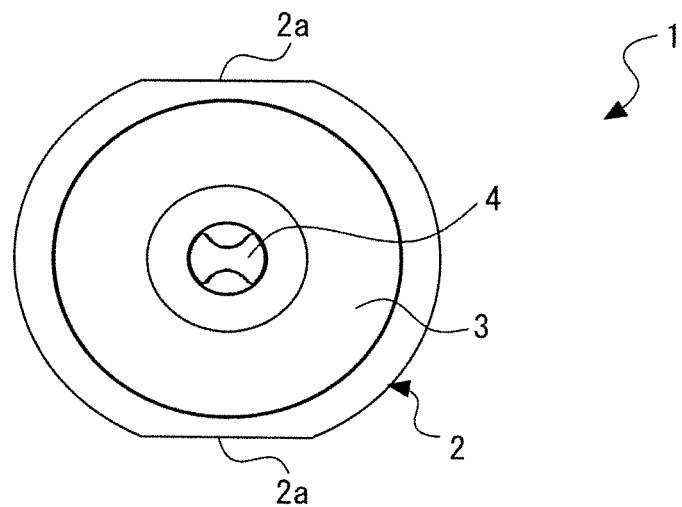
FIG. 1A is a plan view of a rotary damper according to one embodiment of the present invention.

Next, a mode for carrying out the rotary damper according to the present invention will be described. In each of drawings described below, the same or corresponding portions will be described with the same reference numerals.

Figure 1B:
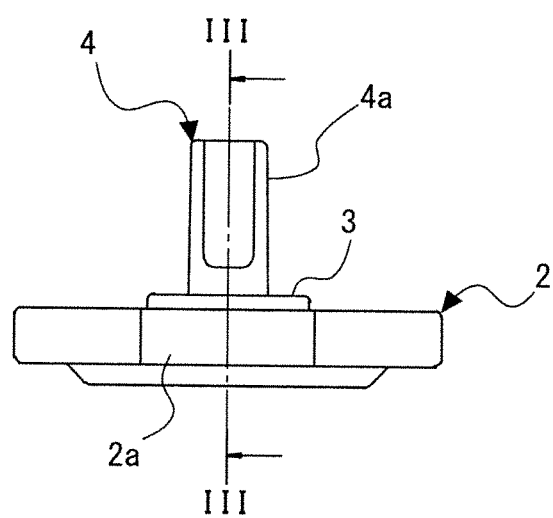
FIG. 1B is a front view thereof.
Figure 1C:
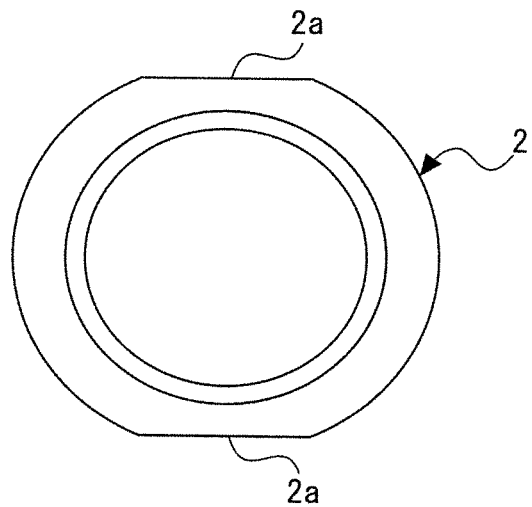
FIG. 1C is a bottom view thereof.
Figure 3:
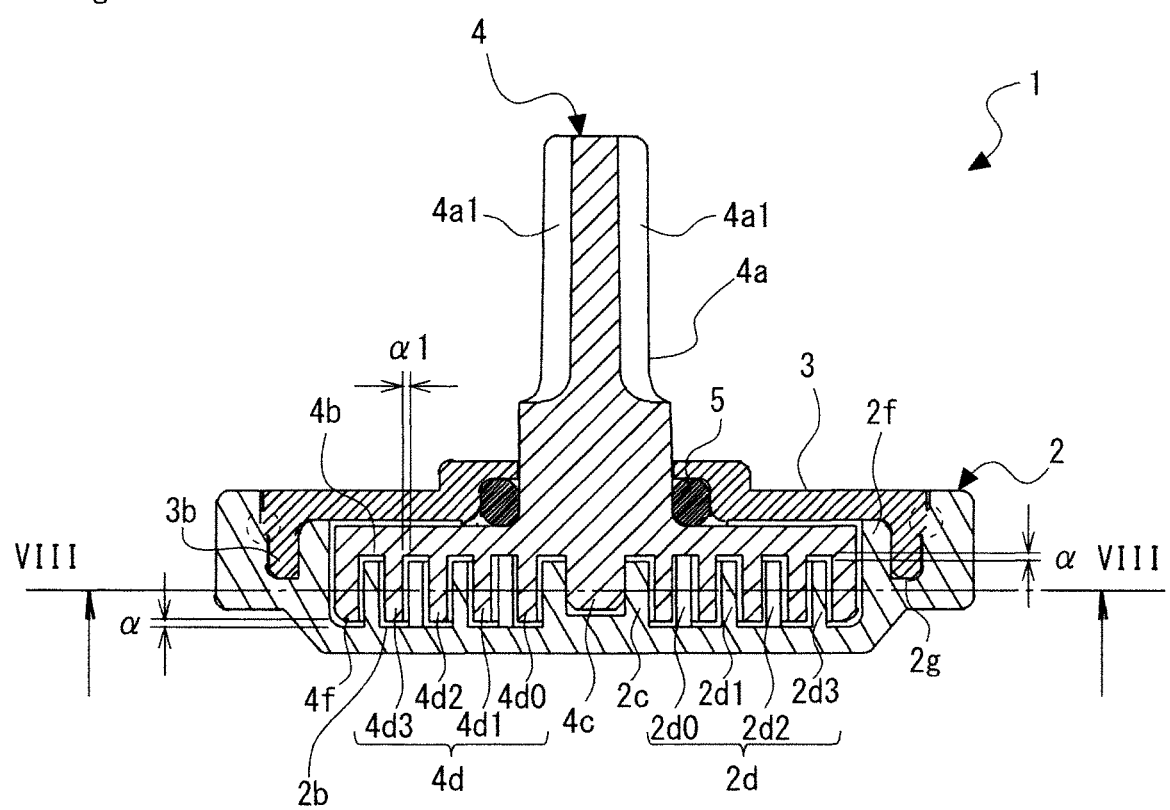
FIG. 3 is a cross-sectional view of the rotary damper according to one embodiment.

FIG. 1A is a plan view of a rotary damper 1 according to one embodiment of the present invention, FIG. 1B is a front view thereof, and FIG. 1C is a bottom view thereof. FIG. 2A is an external perspective view of the rotary damper 1 as viewed from a bottom surface side, and FIG. 2B is an external perspective view of the rotary damper 1 as viewed from a top surface side. Further, FIG. 3 is a cross-sectional view taken along line III-III of the rotary damper 1 in FIG. 1B.

The rotary damper 1 includes a housing 2, a cap 3, a rotor 4, a seal member 5, and a viscous fluid (not illustrated). The housing 2, cap 3, and rotor 4 are made of a resin material, but can also be made of a metal material. The cap 3 closes an opening of the housing 2, and an inside of the housing 2 is filled with the viscous fluid such as silicone oil between the housing 2 and the cap 3. The rotor 4 has a shaft 4a exposed to an outside from the cap 3 and is accommodated in the housing 2, and is rotatably supported by the housing 2. As illustrated in FIG. 3, the seal member 5 is provided between the cap 3 and the shaft 4a, and prevents the viscous fluid from leaking from between the cap 3 and the shaft 4a. The rotary damper 1 imparts a resistance to rotation of the rotor 4 by a torque generated by a shear resistance of the viscous fluid filling the housing 2.

Figures 4A, 4B, 4C, 4D:
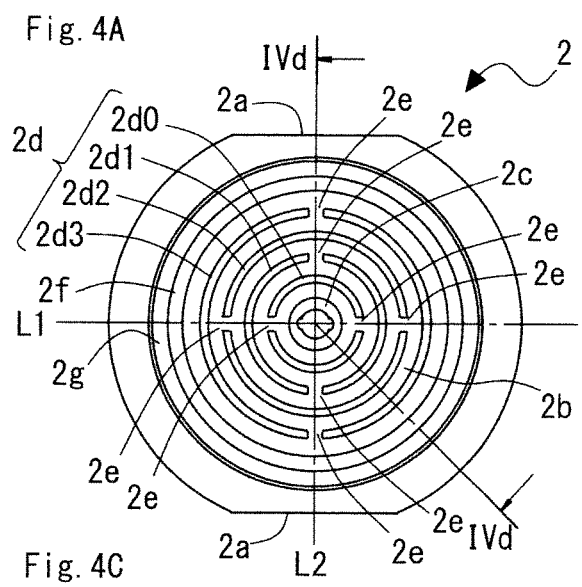
FIG. 4A is a plan view of a housing constituting the rotary damper according to one embodiment.
FIG. 4B is a side view thereof.
FIG. 4C is a front view thereof.
FIG. 4D is a cross-sectional view thereof taken along line IVd-IVd in FIG. 4A.

A plan view of the housing 2 is illustrated in FIG. 4A, a side view thereof is illustrated in FIG. 4B, and a front view thereof is illustrated in FIG. 4C. Further, FIG. 4D illustrates a cross-sectional view taken along line IVd-IVd of the housing 2 in FIG. 4A.

The housing 2 has a disk shape, and facing portions of the outer periphery having a substantially circular shape in a plan view are cut in parallel to form a rotation preventing portion 2a. When the housing 2 is attached to one object of a device to which the rotational resistance is applied by the rotary damper 1, the rotation preventing portion 2a prevents the housing 2 from rotating with respect to the one object.

The housing 2 has a bearing portion 2c formed at a center of a bottom surface 2b facing a side surface 4b (refer to FIG. 3) of the rotor 4. The bearing portion 2c has a hollow cylindrical shape and rotatably supports a shaft center of the shaft 4a of the rotor 4. On the bottom surface 2b of the housing 2, a plurality of walls 2d are erected concentrically centered on the bearing portion 2c. The plurality of walls 2d are shear resistance plates that impart the shear resistance to the viscous fluid during relative rotation between the housing 2 and the rotor 4. In the present embodiment, the plurality of walls 2d include an innermost wall 2d0 and walls 2d1, 2d2, and 2d3 erected first, second, and third outside the innermost wall 2d0. The wall 2d3 erected third outside the innermost wall 2d0 is the outermost wall of these plurality of walls 2d0, 2d1, 2d2, and 2d3.

Notches 2e are formed in the walls 2d0, 2d1, 2d2, and 2d3 at point-symmetrical peripheral positions centered on the bearing portion 2c, and each notch 2e is distributed and arranged at a peripheral position that evenly divides the circumference centered on the bearing portion 2c between the adjacent walls 2d. In the present embodiment, each of the walls 2d0, 2d1, 2d2, and 2d3 is formed with a pair of notches 2e at peripheral positions of each wall 2d facing 180° centered on the bearing portion 2c. The notches 2e formed in the innermost wall 2d0 and the wall 2d2 erected second outside the innermost wall 2d0 are located on a straight line L1. Further, the notches 2e formed in the wall 2d1 erected first outside the innermost wall 2d0 and the outermost wall 2d3 erected third outside the innermost wall 2d0 are located on a straight line L2 orthogonal to the straight line L1 passing through the notches 2e formed in the innermost wall 2d0.

Each of the walls 2d0, 2d1, 2d2, and 2d3 has a height that forms a predetermined gap α (refer to FIG. 3) with the side surface 4b of the rotor 4. In the present embodiment, the innermost wall 2d0 which is one of the plurality of walls 2d0, 2d1, 2d2, and 2d3 formed in the housing 2 is set higher than the other walls 2d1, 2d2, and 2d3, and there is no gap α between the side surface 4b of the rotor 4 and the wall 2d0. In the present embodiment, the gap α is set to 0.2 to 0.25 mm. Further, the housing 2 has a peripheral wall 2f having a height that abuts on the side surface of the cap 3 around the outermost wall 2d3. The housing 2 further has a fitting portion 2g which is formed in an annular shape around the peripheral wall 2f and fitted to the cap 3.

Figure 5D:
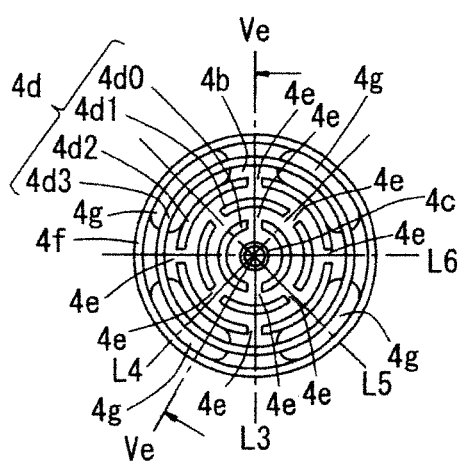
FIG. 5D is a bottom view thereof.
Figure 5A:
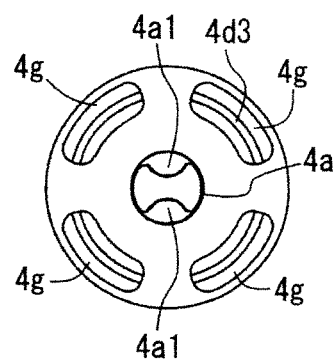
FIG. 5A is a plan view of a rotor constituting the rotary damper according to one embodiment.
Figure 5B:
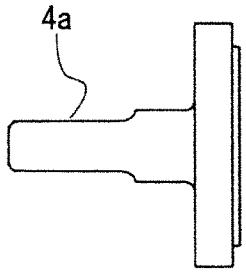
FIG. 5B is a side view thereof.
Figure 5E:
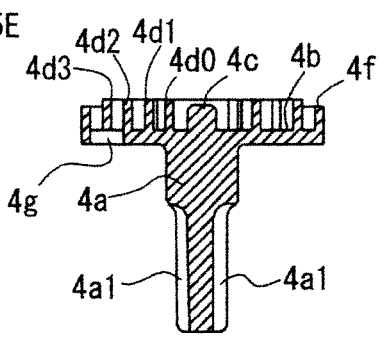
FIG. 5E is a cross-sectional view thereof taken along line Ve-Ve in FIG. 5D.
Figure 5C:
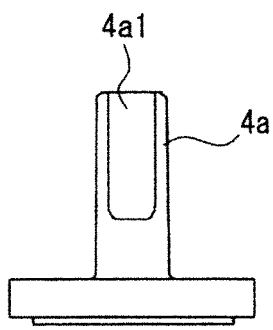
FIG. 5C is a front view thereof.

A plan view of the rotor 4 is illustrated in FIG. 5A, a side view thereof is illustrated in FIG. 5B, a front view thereof is illustrated in FIG. 5C, and a bottom view thereof is illustrated in FIG. 5D. Further, FIG. 5E illustrates a cross-sectional view taken along line Ve-Ve of the rotor 4 in FIG. 5D.

The rotor 4 has a disk shape in which the shaft 4a is erected at the center. Although the shaft 4a has a columnar shape, recesses are symmetrically formed in facing portions on the outer periphery to form rotation preventing portions 4a1. When the shaft 4a is attached to the other object of the device to which the rotational resistance is applied by the rotary damper 1, the rotation preventing portion 4al prevents the shaft 4a from rotating with respect to the other object.

The rotor 4 has a center pin 4c formed as a supported portion at the center of the side surface 4b facing the bottom surface 2b of the housing 2. The center pin 4c has a columnar shape, is fitted into the hollow portion of the bearing portion 2c of the hollow cylindrical housing 2, and is rotatably supported by the bearing portion 2c. On the side surface 4b of the rotor 4, a plurality of walls 4d are erected concentrically centered on the center pin 4c at a pitch deviated from a standing pitch of the wall 2d of the housing 2 by a half pitch. The plurality of walls 4d, together with the walls 2d of the housing 2, serve as a shear resistance plate that imparts the shear resistance to the viscous fluid when the housing 2 and the rotor 4 rotate relative to each other. In the present embodiment, the plurality of walls 4d includes an innermost wall 4d0 and walls 4d1, 4d2, and 4d3 erected first, second, and third outside the innermost wall 4d0. The wall 4d3 erected third outside the innermost wall 4d0 is the outermost wall of the plurality of walls 4d0, 4d1, 4d2, and 4d3.

Notches 4e are formed in the walls 4d0, 4d1, and 4d2 surrounded by the outermost wall 4d3 at point-symmetrical peripheral positions centered on the center pin 4c, and each notch 4e is distributed and arranged at a peripheral position that evenly divides the circumference centered on the center pin 4c between the adjacent walls 4d. In the present embodiment, a pair of notches 4e is formed in the innermost wall 4d0 at peripheral positions facing 180° centered on the center pin 4c. Further, the notches 4e formed in the wall 4d1 erected first outside the innermost wall 4d0 are located at four locations on two straight lines L4 and L5 inclined by 45° to a straight line L3 passing through the notches 4e of the innermost wall 4d0. Further, the notches 4e formed in the wall 4d2 erected second outside the innermost wall 4d0 are located at four locations on two straight lines of the straight line L3 passing through each notch 4e of the innermost wall 4d0 and a straight line L6 orthogonal to this straight line L3.

The walls 4d0, 4d1, 4d2, and 4d3 and a peripheral wall 4f have a height that forms the predetermined gap α (refer to FIG. 3) with the bottom surface 2b of the housing 2 in an axial direction of the shaft 4a, and have a thickness that forms a predetermined gap α1 with the walls 2d0, 2d1, 2d2, and 2d3 of the housing 2 in the radial direction of the housing 2. Further, the rotor 4 has the peripheral wall 4f erected around the outermost wall 4d3. The peripheral wall 4f has the height that forms the predetermined gap α with the bottom surface 2b of the housing 2, but in FIG. 5, the height of the peripheral wall 4f is illustrated lower than the heights of the walls 4d0, 4d1, 4d2, and 4d3. The height of the peripheral wall 4f is basically set to be equal to the heights of the walls 4d0, 4d1, 4d2, and 4d3 as illustrated in FIG. 3. As illustrated in FIG. 5, when the height of the peripheral wall 4f is set lower than the height of the walls 4d0, 4d1, 4d2, and 4d3, the rotational resistance of the rotor 4 is set low. The rotor 4 further has a discharge hole 4g for opening the side surface 4b of the rotor 4 on an inner peripheral side of the peripheral wall 4f. A plurality of the discharge holes 4g are formed at equal intervals with equal arc lengths in the circumferential direction centered on the center pin 4c. In the present embodiment, four discharge holes 4g are formed in the circumferential direction centered on the center pin 4c. Further, the radial direction of the discharge hole 4g is formed between an outer diameter of one inner wall 4d2 of the outermost periphery and an inner diameter of the peripheral wall 4f, and the outermost wall 4d3 is located at the center of the radial width of each discharge hole 4g.

A plan view of the cap 3 is illustrated in FIG. 6A, a front view thereof is illustrated in FIG. 6B, and a bottom view thereof is illustrated in FIG. 6C. Further, FIG. 6D illustrates a cross-sectional view taken along line VId-VId of the cap 3 in FIG. 6A.

The cap 3 is also disk-shaped and has a lid portion 3a, a peripheral edge portion 3b, an opening portion 3c, a thrust bearing portion 3d, a radial bearing portion 3e, and a seal portion 3f. When the cap 3 is attached to the housing 2, the lid portion 3a covers a side surface of the rotor 4 opposite to the side surface 4b on which the plurality of walls 4d are formed. Further, the peripheral edge portion 3b formed so as to protrude around the lid portion 3a is fitted into the fitting portion 2g of the housing 2 formed in the recessed portion. In this case, the peripheral edge portion 3b of the cap 3 and the fitting portion 2g of the housing 2 abut on each other at a location surrounded by broken line circles in FIG. 3 on the outer periphery of the peripheral edge portion 3b of the cap 3. At this abutment location, the outer periphery of the peripheral edge portion 3b is ultrasonically welded to the fitting portion 2g, the outer periphery of the peripheral edge portion 3b and the fitting portion 2g are melted and fixed to each other, and a space between the peripheral edge portion 3b and the fitting portion 2g is sealed. When the housing 2 and the cap 3 are formed of a metal material, the outer periphery of the peripheral edge portion 3b is welded to the fitting portion 2g, and the space between the peripheral edge portion 3b and the fitting portion 2g is sealed.

The shaft 4a is inserted through the opening portion 3c, and the seal member 5 is mounted on the cylindrical groove-shaped seal portion 3f in order to prevent viscous fluid from leaking from a gap between the cap 3 and the shaft 4a. The thrust bearing portion 3d that receives a load in the axial direction applied from the shaft 4a is formed on the bottom surface of the cylindrical groove of the seal portion 3f. Further, on the side surface of the cylindrical groove of the seal portion 3f, the radial bearing portion 3e that receives a load in the radial direction applied from the shaft 4a is formed.

A plan view of the seal member 5 is illustrated in FIG. 7A, and a side view thereof is illustrated in FIG. 7B. The seal member 5 is a donut-shaped O-ring and has elasticity. The seal member 5 is attached to a base of the shaft 4a, and when the shaft 4a is inserted into the opening portion 3c of the cap 3, the seal member 5 is mounted on the seal portion 3f of the cap 3.

When assembling the rotary damper 1, the housing 2 is first placed on a horizontal and flat board, for example, on a table of an assembly workbench, with the side surface 2b on which the wall 2d is formed facing up. Next, the viscous fluid having a fixed amount is injected radially centered on the bearing portion 2c of the housing 2. Next, the seal member 5 is attached to the base of the shaft 4a of the rotor 4, and the rotor 4 is assembled to the housing 2 with the relative positions of the rotor 4 and the housing 2 set to the following fixed positions. After that, the opening portion 3c of the cap 3 is inserted into the shaft 4a, and the peripheral edge portion 3b of the cap 3 is fitted into the fitting portion 2g of the housing 2. Subsequently, ultrasonic welding is performed on the peripheral edge portion 3b and the fitting portion 2g to complete the assembly of the rotary damper 1.

Figure 8:
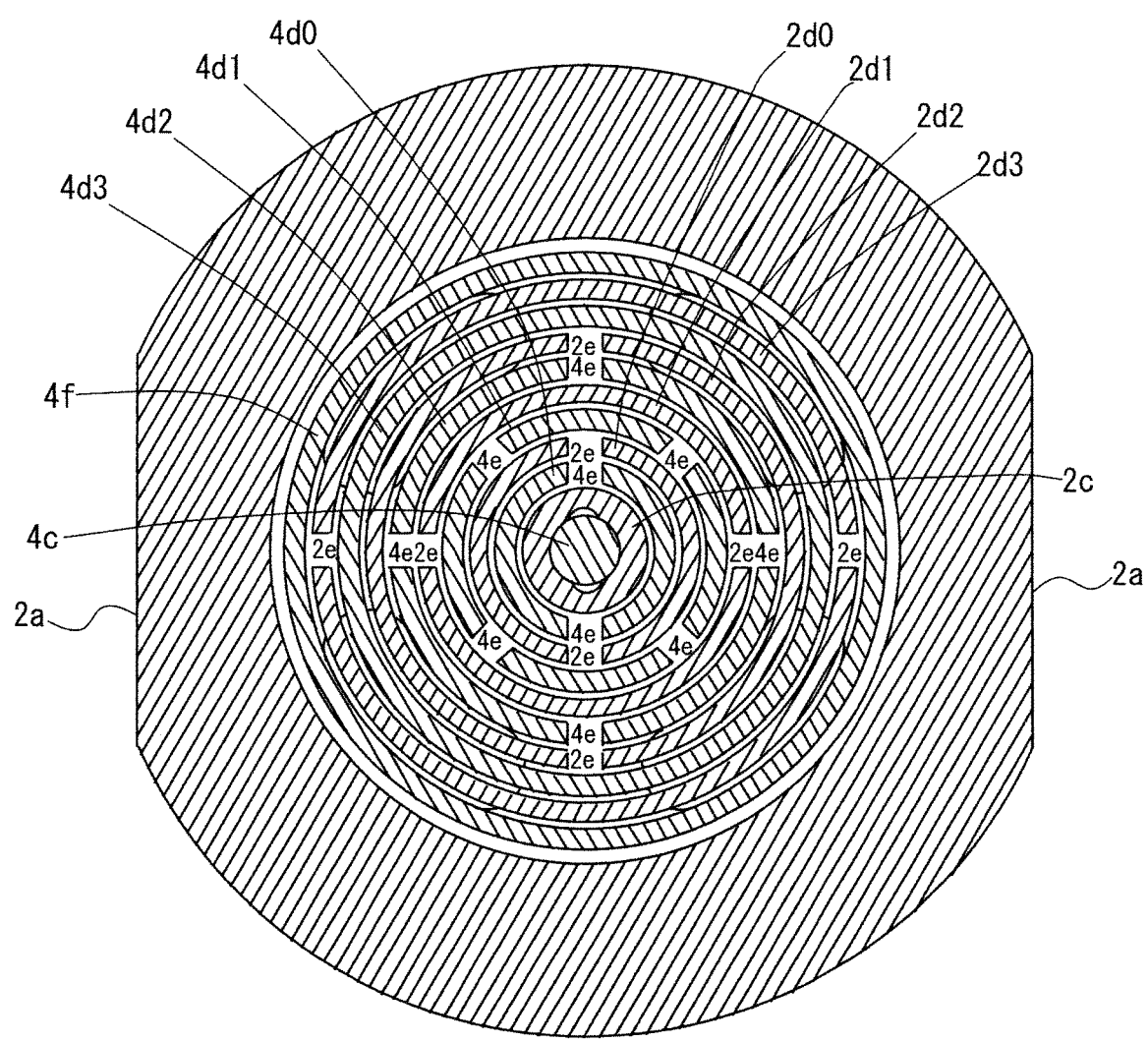
FIG. 8 is a cross-sectional view illustrating an arrangement state of walls of the housing and the rotor in the rotary damper according to one embodiment.

In the rotary damper 1 of the present embodiment, when the center pin 4c of the rotor 4 is supported by the bearing portion 2c of the housing 2 and the rotor 4 is accommodated in the housing 2, the rotor 4 is accommodated in the housing 2 to realize a fixed position at which the notches 2e formed in the walls 2d0, 2d1, 2d2, and 2d3 of the housing 2 and the notches 4e formed in the walls 4d0, 4d1, 4d2, and 4d3 of the rotor 4 are arranged at point-symmetrical peripheral positions centered on the bearing portion 2c of the housing 2. That is, the rotor 4 is accommodated in the housing 2 to realize the fixed position at which the straight line L1 passing through each notch 2e formed in the innermost wall 2d0 of the housing 2 at the peripheral position facing 180° and the straight line L3 passing through each notch 4e formed in the innermost wall 4d0 of the rotor 4 at the peripheral position facing 180° are orthogonal to each other. By accommodating the rotor 4 in the housing 2 in this manner, the notches 2e and 4e are evenly distributed and arranged in the circumferential direction centered on the bearing portion 2c of the housing 2 as illustrated in FIG. 8. FIG. 8 is a cross-sectional view taken along line VIII-VIII of the rotary damper 1 illustrated in FIG. 3.

Figure 9:
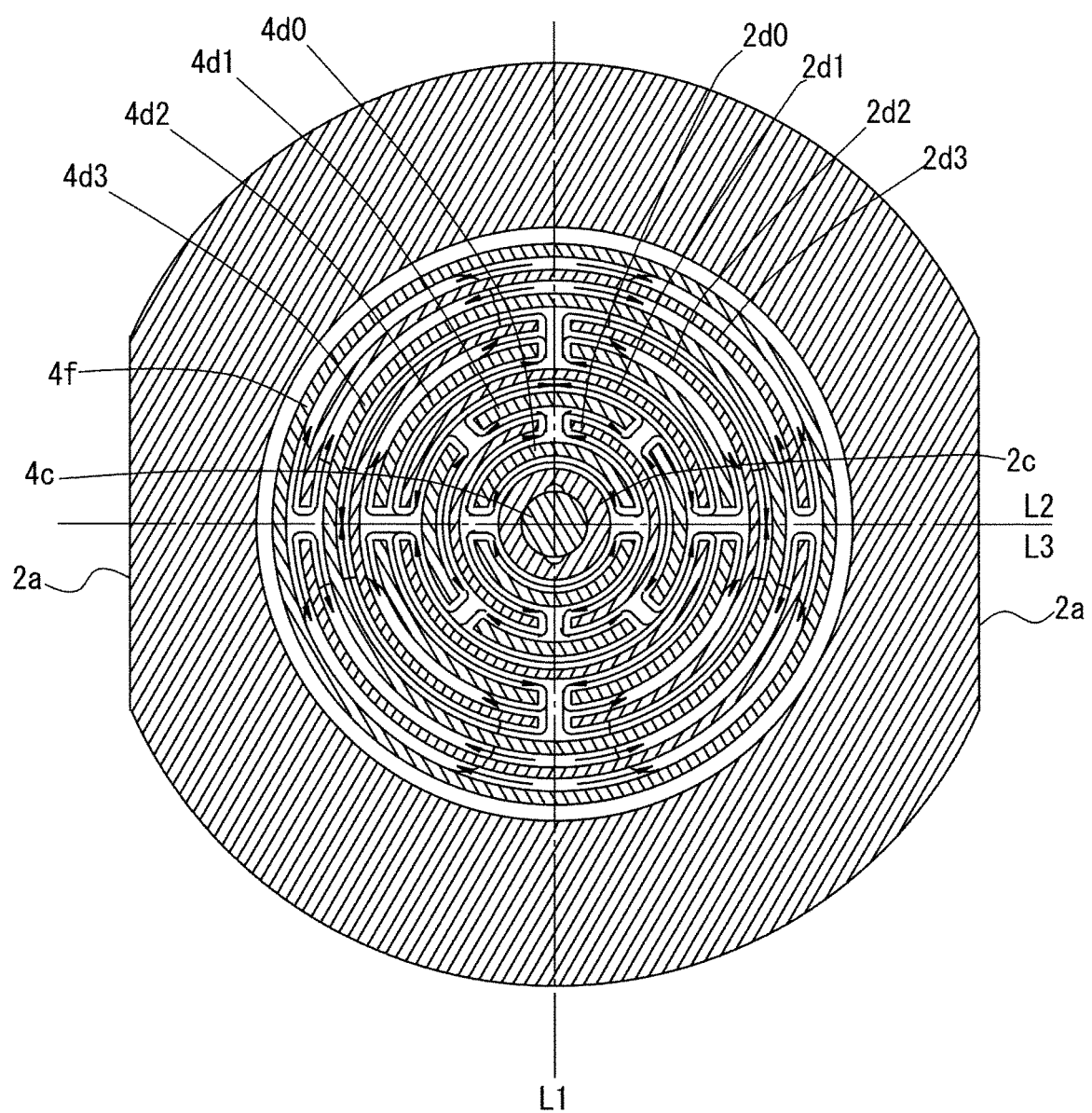
FIG. 9 is a cross-sectional view illustrating a flow path of a viscous fluid formed by the walls of the housing and the rotor in the rotary damper according to one embodiment.

In this state, a flow path of the viscous fluid extending radially while bending centered on the bearing portion 2c of the housing 2 is formed as illustrated by arrows illustrated in FIG. 9. That is, the viscous fluid radially put centered on the bearing portion 2c of the housing 2 enters a circumferential groove formed between the outer periphery of the bearing portion 2c and the innermost wall 4d0 of the rotor 4, and moves from the pair of notches 4e formed in the innermost wall 4d0 to a circumferential groove formed between the innermost wall 4d0 and the innermost wall 2d0 of the housing 2. The viscous fluid that has moved to this circumferential groove moves to a circumferential groove formed between the innermost wall 2d0 and the wall 4d1 of the rotor 4 from the pair of notches 2e formed in the innermost wall 2d0 of the housing 2. As described above, the viscous fluid moves one after another through the circumferential grooves formed between the walls 2d0, 2d1, 2d2, and 2d3 of the housing 2 and the walls 4d0, 4d1, 4d2, and 4d3 of the rotor 4 toward the outer periphery of the housing 2 via the notches 2e and 4e.

Therefore, when assembling the rotary damper 1, after injecting a certain amount of viscous fluid into the bearing portion 2c of the housing 2, in a case where the relative position between the housing 2 and the rotor 4 is set to the above-mentioned fixed position and the rotor 4 is accommodated in the housing 2, the viscous fluid travels along the flow path of the viscous fluid that extends radially while bending centered on the bearing portion 2c of the housing 2, and the viscous fluid is evenly distributed and moves quickly toward the outer periphery of the housing 2 while being promoted by the weight of the rotor 4 together with airs mixed in the viscous fluid and becoming bubbles. When the viscous fluid reaches the plurality of discharge holes 4g formed on the inner peripheral side of the peripheral wall 4f of the rotor 4, the airs contained in the viscous fluid moved as described above toward the outer periphery of the housing 2 are extruded by the viscous fluid from the plurality of discharge holes 4g that open the side surface of the rotor 4, and is discharged to the outside from between the bottom surface 2b of the housing 2 and the side surface 4b of the rotor 4. In this case, since the notch 4e is not formed in the outermost wall 4d3 of the rotor 4, a momentum of the viscous fluid toward the outer periphery of the housing 2 is suppressed by the outermost wall 4d3, and the viscous fluid is prevented from overflowing to the fitting portion 2g of the housing 2.

In this state where the airs mixed in the viscous fluid are discharged from the discharge hole 4g, the cap 3 is put on the side surface opposite to the side surface 4b on which the wall 4d of the rotor 4 is formed, the peripheral edge portion 3b of the cap 3 is fitted to the fitting portion 2g of the housing 2, and thus, it is possible to obtain the rotary damper 1 in which airs do not stay inside the housing 2. Therefore, it is possible to provide the rotary damper 1 that does not cause a problem that the rotational resistance fluctuates during the rotation of the rotor 4.

Further, in the rotary damper 1 of the present embodiment, the size of the predetermined gap α formed between tips of the plurality of walls 2d formed in the housing 2 and the side surface 4b of the rotor 4, and the size of the predetermined gap α formed between tips of the plurality of walls 4d formed in the rotor 4 and the bottom surface 2b of the housing 2 are increased by a degree that one wall 2d0 of the plurality of walls 2d0, 2d1, 2d2, and 2d3 formed in the housing 2 is higher than the other walls 2d1, 2d2, and 2d3. Therefore, in this case, a ratio of the fluctuation in the size of each predetermined gap α caused by variation in dimensions of parts to the size of each predetermined gap α becomes small. Therefore, even when the size of each predetermined gap α varies, it is possible to suppress the fluctuation in the rotational resistance of the rotor 4 due to the variation.

For example, when the above one wall 2d0 is set to the same height as those of the other walls 2d1, 2d2, and 2d3 and the size of the predetermined gap α is set to 0.05 to 0.1 mm, the fluctuation in the size of each predetermined gap α caused by the variation in the dimensions of the parts, for example, the ratio of 0.05 mm to the size of each predetermined gap α, becomes large as 100 to 50%. Therefore, when the size of each predetermined gap α varies, the rotational resistance of the rotor 4 fluctuates greatly due to the variation. However, as in the present embodiment, when one wall 2d0 is made higher than the other walls 2d1, 2d2, and 2d3, and the size of each predetermined gap α is set to be large, for example, 0.2 to 0.25 mm as in the present embodiment, due to the higher height, the fluctuation of the size of each predetermined gap α caused by the variation in the dimensions of the parts, for example, the ratio of 0.05 mm to the size of each predetermined gap α becomes small as 25 to 20%. Therefore, as described above, even when the size of each predetermined gap α varies, it is possible to suppress the fluctuation in the rotational resistance of the rotor 4 due to the variation.

Further, in the rotary damper 1 of the present embodiment, as described above, the radial direction of the discharge hole 4g is formed between the outer diameter of one inner wall 4d2 of the outermost periphery and the inner diameter of the peripheral wall 4f, and the outermost wall 4d3 of the rotor 4 is located at the center of the radial width of each discharge hole 4g. Therefore, the airs contained in the viscous fluid that has reached one inner wall 4d2 of the outermost periphery via the above-mentioned flow path of the viscous fluid are quickly discharged from each discharge hole 4g, and the airs contained in the viscous fluid that get over the wall 4d3 of the outermost circumference not having the notch 4e is also quickly discharged from each discharge hole 4g. Therefore, the airs contained in the viscous fluid are efficiently discharged from each discharge hole 4g.

Further, in the rotary damper 1 of the present embodiment, as described above, the outer periphery of the peripheral edge portion 3b of the cap 3 is ultrasonically welded to the fitting portion 2g of the housing 2, and thus, the opening of the housing 2 is closed and sealed by the cap 3. According to this configuration, the welded location between the housing 2 and the cap 3 is located higher than the bottom of the recess on the outer peripheral side of the inner part of the recessed fitting portion 2g, and the welded location is set to a location where the viscous fluid filling the inside of the housing 2 does not reach. Therefore, it is possible to prevent the viscous fluid from reaching the welded location between the housing 2 and the cap 3 and making it impossible to weld the housing 2 and the cap 3. Therefore, the housing 2 and the cap 3 are surely ultrasonically welded at the abutment location between the outer periphery of the peripheral edge portion 3b of the cap 3 and the fitting portion 2g of the housing 2, and thus, the opening of the housing 2 is surely closed and sealed by the cap 3.

In the above embodiment, the case where one wall 2d0 of the plurality of walls 2d0, 2d1, 2d2, and 2d3 formed in the housing 2 is made higher than the other walls 2d1, 2d2, and 2d3 has been described. However, one of the plurality of walls 4d0, 4d1, 4d2, and 4d3 formed in the rotor 4, for example, the innermost wall 4d0 may be set higher than the other walls 4d1, 4d2, and 4d3. Even in the configuration of the modification example, the size of the predetermined gap α formed between the tips of the plurality of walls 2d formed in the housing 2 and the side surface 4b of the rotor 4 and the size of the predetermined gap a formed between the tips of the plurality of walls 4d formed in the rotor 4 and the bottom surface 2b of the housing 2 are increased by a degree that one wall 2d0 is higher than the other walls 4d1, 4d2, and 4d3, and thus, the same action and effect as those of the embodiment are exhibited.

As for the higher wall 2d or 4d, the smaller the radius becomes, the smaller the influence on the shear resistance of the viscous fluid, that is, the influence on the rotational resistance of the rotor 4 becomes, and thus, as described above, it is preferable to select the wall 2d or wall 4d that makes the innermost wall 2d0 or wall 4d0 to be high.

Figure 10:
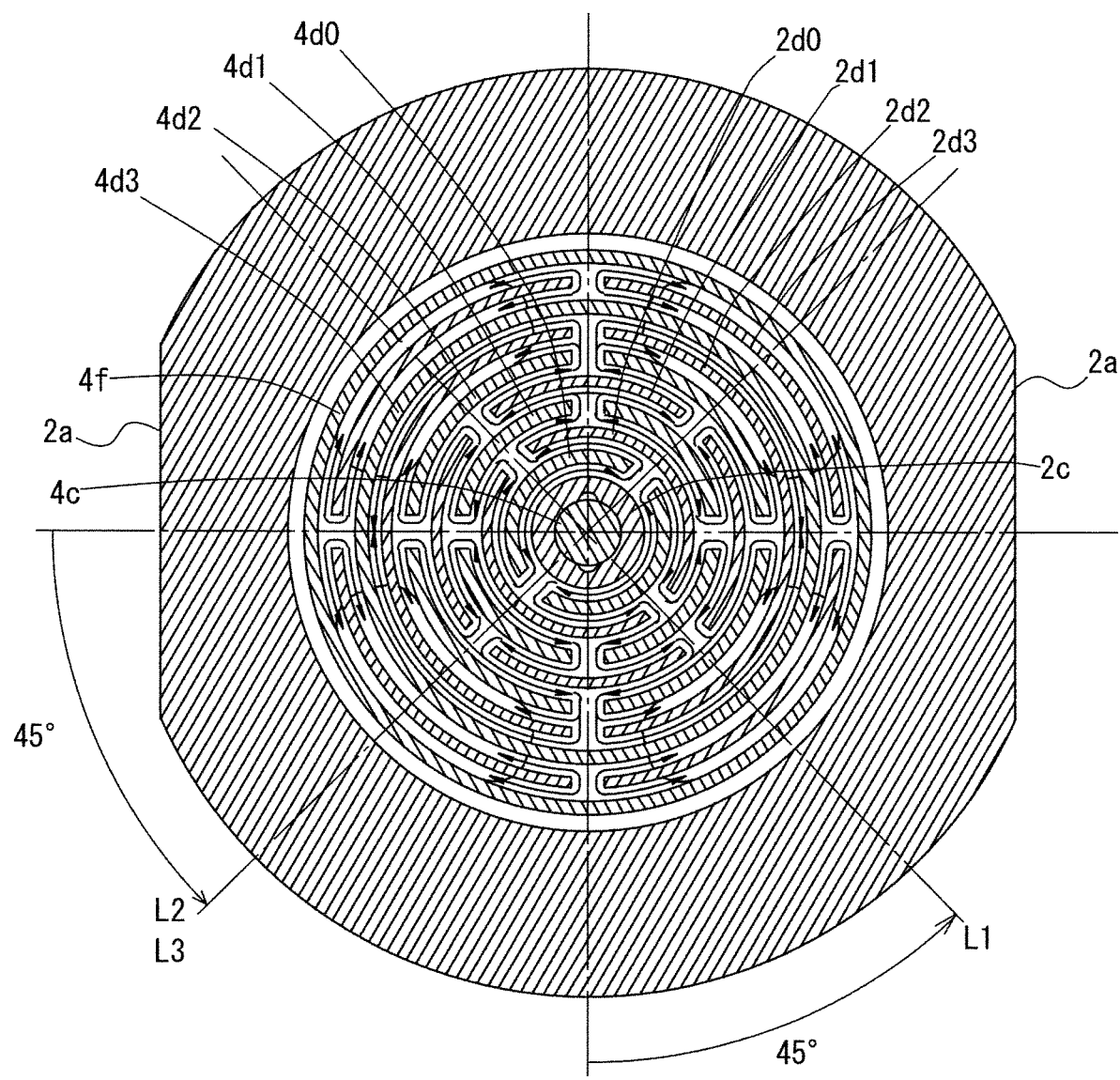
FIG. 10 is a cross-sectional view illustrating another flow path of a viscous fluid formed by walls of a housing according to a modification example and the rotor according to one embodiment.

Further, in the above embodiment, the case has been described, in which, as illustrated in FIG. 4A, the straight line L1 passing through the notches 2e formed in the innermost wall 2d0 of the housing 2 and the wall 2d2 erected second outside the innermost wall 2d0 is parallel to the rotation preventing portion 2a, and the straight line L2 passing through the notches 2e formed in the walls 2d1 and 2d3 erected first and third outside the innermost wall 2d0 is perpendicular to the rotation preventing portion 2a. However, as in a modification example illustrated in FIG. 10, in the straight line L1 passing through the notches 2e formed in the innermost wall 2d0 of the housing 2 and the wall 2d2 erected second outside the innermost wall 2d0 and the straight line L2 passing through the notches 2e formed in the walls 2d1 and 2d3 erected first and third outside the innermost wall 2d0, the notches 2e may be arranged at positions at which the straight lines L1 and L2 are rotated 45° counterclockwise. Also in this case, when the rotor 4 is accommodated in the housing 2, the rotor 4 is accommodated in the housing 2 to realize a fixed position at which the straight line L1 passing through the notches 2e formed in the innermost wall 2d0 of the housing 2 and the straight line L3 passing through the notches 4e formed in the innermost wall 4d0 of the rotor 4 are orthogonal to each other. Therefore, the notches 2e and 4e are evenly distributed and arranged in the circumferential direction centered on the bearing portion 2c of the housing 2, and have the same action and effect as those in the above embodiment.

Figure 11A:
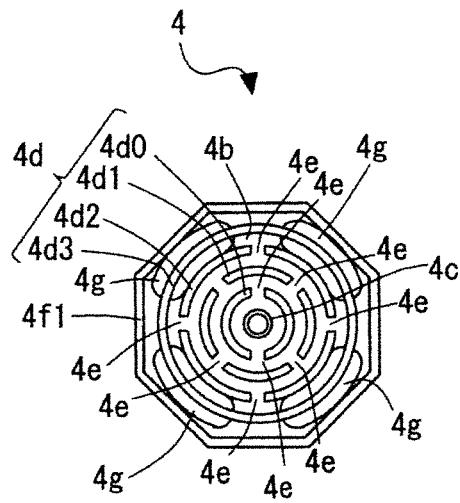
FIG. 11A is a bottom view of a rotor according to a modification example.
Figure 11B:
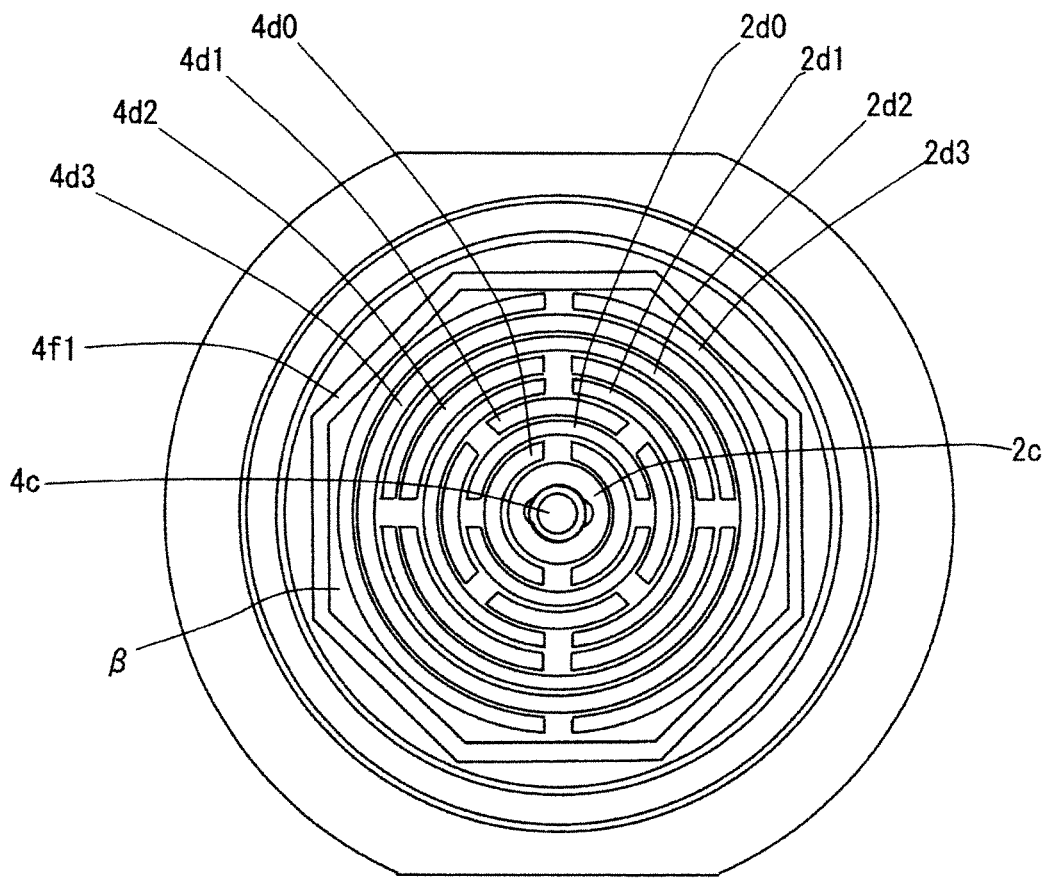
FIG. 11B is a cross-sectional view illustrating an arrangement state of walls of the rotor according to the modification example and the housing according to one embodiment.

Further, in the above-described embodiment and each modification example, as illustrated in FIG. 5D, the case where the peripheral wall 4f of the rotor 4 is formed in an annular shape has been described. However, as illustrated in a bottom view of a rotor 4 according to the modification example illustrated in FIG. 11A, a peripheral wall 4f1 of the rotor 4 may be formed in a polygonal shape. According to this configuration, as illustrated in FIG. 11B in which the rotor 4 is accommodated in the housing 2, a radial gap β between the peripheral wall 4f1 of the rotor 4 and the outermost wall 2d3 of the housing 2 is formed large at a corner portion of the peripheral wall 4f1 having a polygonal shape. Therefore, even when this gap β is small in a side portion of the peripheral wall 4f1 having a polygonal shape, the viscous fluid that reaches this gap β smoothly flows from the gap β large formed in the corner portion of the peripheral wall 4f1 to the small gap β formed in the side portion of the peripheral wall 4f1, and quickly fills the entire gap. Therefore, the airs contained in the viscous fluid that reaches the gap β are quickly discharged to the outside from the discharge hole 4g via the gap β. Further, by changing the number of angles of the polygonal shape of the peripheral wall 4f1, for example, changing the octagon to a hexagon, the overall size of the gap β is adjusted, and thus, the magnitude of the rotational resistance given to the rotation of the rotor 4 can be finely adjusted.

INDUSTRIAL APPLICABILITY

A rotary damper 1 according to the present invention can be used, for example, as a device for braking rotation by imparting resistance to rotation of a driven gear that meshes with a gear or a rack.

REFERENCE SIGNS LIST

1: Rotary damper
2: Housing
2a: Rotation preventing portion
2b: Bottom surface
2c: Bearing portion
2d, 2d0, 2d1, 2d2, 2d3, 4d, 4d0, 4d1, 4d2, 4d3: Wall
2e, 4e: Notch
2f, 4f, 4f1: Peripheral wall
2g: Fitting portion
3: Cap
3a: Lid portion
3b: Peripheral edge portion
3c: Opening portion
3d: Thrust bearing portion
3e: Radial bearing portion
3f: Seal portion
4: Rotor
4a: Shaft 4al: Rotation preventing portion
4b: Side surface
4c: Center pin (supported portion)
4g: Discharge hole
5: Seal member
α: Predetermined gap

The invention claimed is:

1. A rotary damper comprising:
a housing of which an inside is filled with a viscous fluid;
a cap which closes an opening of the housing; and
a rotor which exposes a shaft to an outside from the cap and is accommodated in the housing and rotatably supported with respect to the housing,
wherein the rotary damper imparts a resistance to rotation of the rotor by a torque generated by a shear resistance of the viscous fluid,
the housing includes a bearing portion which is formed at a center of a bottom surface facing a side surface of the rotor and rotatably supports a shaft center of the shaft, a plurality of walls which are erected concentrically centered on the bearing portion, include notches which are formed at point-symmetrical peripheral positions centered on the bearing portion and distributed and arranged at peripheral positions evenly dividing circumferences centered on the bearing portion between adjacent walls, and have a height forming a predetermined gap with the side surface of the rotor, a peripheral wall which is formed around an outermost wall of the plurality of walls and has a height abutting on a side surface of the cap, and a fitting portion which is formed around the peripheral wall and fitted to the cap,
the rotor includes a supported portion which is formed at a center of the side surface facing the bottom surface of the housing and rotatably supported by the bearing portion, a plurality of walls which are erected concentrically centered on the supported portion at a pitch deviated from a standing pitch of the walls of the housing by a half pitch, includes notches formed in walls surrounded by an outermost wall at point-symmetrical peripheral positions centered on the supported portion and distributed and arranged at peripheral positions evenly dividing circumferences centered on the supported portion between adjacent walls, and have a height forming a predetermined gap with the bottom surface of the housing, a peripheral wall formed in a polygonal shape which is erected around the outermost wall of the plurality of walls and has a height forming a predetermined gap with the bottom surface of the housing, and a plurality of discharge holes which are formed at equal intervals with equal arc lengths in a circumferential direction centered on the supported portion and open the side surface of the rotor on an inner peripheral side of the peripheral wall, and
the cap has a lid portion which covers a side surface of the rotor opposite to the side surface on which the plurality of walls are formed, and a peripheral edge portion which is formed around the lid portion and is fitted to the fitting portion of the housing.

2. The rotary damper according to claim 1, wherein in the housing, a pair of the notches is formed at peripheral positions of each wall facing 180° centered on the bearing portion, the notches formed in an innermost wall and a wall erected second outside the innermost wall are located on a straight line, and the notches formed in a wall erected first outside the innermost wall and the outermost wall erected third outside the innermost wall are located on a straight line orthogonal to the straight line passing through the notches formed in the innermost wall, and
in the rotor, a pair of the notches is formed at peripheral positions of an innermost wall facing 180° centered on the supported portion, the notches formed in a wall erected first outside the innermost wall are located at four locations on two straight lines each inclined by 45° to a straight line passing through the notches of the innermost wall, the notches formed in a wall erected second outside the innermost wall are located at four locations on two straight lines of the straight line passing through the notches of the innermost wall and a straight line orthogonal to the straight line, and the outermost wall is erected third outside the innermost wall.

3. The rotary damper according to claim 1, wherein one wall of the plurality of walls formed in the housing is higher than the other walls, or one wall of the plurality of walls formed in the rotor is higher than the other walls.

4. The rotary damper according to claim 1, wherein a radial direction of each of the plurality of discharge holes is formed between an outer diameter of one inner wall of an outermost periphery and an inner diameter of the peripheral wall which are formed in the rotor, and the outermost wall formed in the rotor located at a center of a radial width of each discharge hole.

5. The rotary damper according to claim 1, wherein in the opening of the housing, an abutment location between an outer periphery of the peripheral edge portion of the cap and the fitting portion of the housing is welded and sealed.

* * * * *